Figure 1:
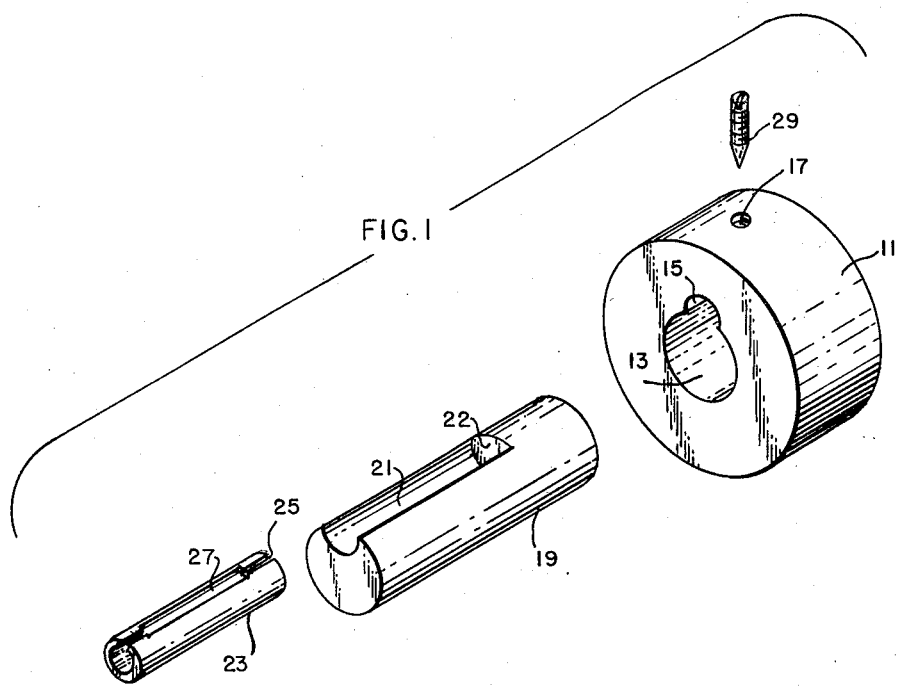

Sept. 24, 1957     L. H. SEIBERT     2,807,485
MACHINE KEY
Filed March 1, 1954

INVENTOR.
LAURENCE H. SEIBERT
BY
*Harry M. Saragovitz*
ATTORNEY

United States Patent Office 2,807,485
Patented Sept. 24, 1957

2,807,485

MACHINE KEY

Laurence H. Seibert, Little Silver, N. J.

Application March 1, 1954, Serial No. 413,485

4 Claims. (Cl. 287—52.05)

(Granted under Title 35, U. S. Code (1952), sec. 266)

The invention described herein may be manufactured and used by or for the Government for governmental purposes without the payment of any royalty thereon.

The present invention relates to a retaining or fastening device and more particularly, is concerned with a device to prevent relative movement between a shaft and a sleeve or hub. Heretofore many types of keying device have been designed, including the square or rectangular key devices used for applications similar to those described herein. Such keying devices required precise machining of the shaft and hub, thus entailing considerable expense in the preparation thereof. In the square or rectangular type of keying device used, it was also found that such forms of key required squared corner recesses in the shaft and hub which tend to cause undesirable concentration of stresses. It was also found that because of their parallel-sided designs there was, of necessity, some clearance between the shaft and key and between the key and the hub when assembled. Such clearances allow some small relative motion and produces wear and possible ultimate failure of the keying device. Set screws heretofore used to bear upon the key and help reduce this motion have been used. In many instances where keys were used they were usually driven or forced into position with no provision being made for removal of the same.

Accordingly, it is an object of the present invention to devise a machine key so designed as to have a free fit in its locking position until a uniquely-shaped set screw is used, thus facilitating the installation and removal of the key and separation of the hub and shaft. An important feature of the invention resides in the fact that the keying device can be frequently disassembled, such as for emergency repair.

A feature of the invention lies in the fact that the keying device of the present invention can be fabricated from conventional stock material. A still further feature is that the key herein provides a more efficient distribution of stress in the shaft due to the absence of squared recesses in the shaft. Another feature is that the key is symmetrical along the axis of the shaft thereby preventing any unbalanced force parallel to the shaft and further does not cause any noticeable eccentricity between the shaft and the hub.

Figure 2:
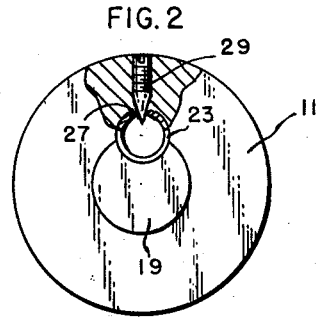

The present invention comprises generally a retaining device for securing a shaft in a hub consisting of a rolled cylindrical key provided with a longitudinal slot having an intermediate central portion wider than both end portions. The wide portion of the slot is adapted to accommodate the conical point of a set screw forming part of the general combination herein. Recesses are formed in both the shaft and the inner periphery of the hub to accommodate the key partially within the shaft and partially within the hub, and the hub is provided with an opening through which said set screw is inserted to become wedged into the slot of the key whereby the shaft and hub are rigidly held together. The invention can best be understood from the following description to be read in view of the accompanying drawing in which:

Figure 1 is an exploded view in perspective showing the various elements of the unassembled device, and Figure 2 is a cross-section view partly broken away showing the assembled device.

Referring to the drawing, there is shown a hub 11 provided with a central bore 13, said bore having an arcuately extending portion 15 coextensive with the major bore 13. The hub 11 is further characterized by having a threaded opening 17 extending from the outer periphery of said hub through and to portion 15. A cylindrical shaft 19 is adaptable for engagement with the bore 13 and is provided with a lengthwise arcuately disposed groove 21, terminating in an end wall 22 which, when the shaft 19 extends through hub 11, forms a circular bore when said groove is in juxtaposition with the arcuately extending portion 15 of the hub 11. A key 23 of sufficient length to fit within the groove 21 of shaft 19 forms an integral part of the present invention. The key 23 is made of a rolled, hardened, tubular steel stock and is of a diameter slightly smaller than the diameter of the bore formed by the combined arcuate portion 15 and groove 11, and is characterized by having a slit 25 throughout its entire length. The slit 25 is relatively narrow at its ends but slightly widened as at 27 at its central portion as shown in Figure 1. For combining the various components together a set screw is provided having a conical or tapered end which can be screwed into the opening 17 of hub 11.

In the assembly of the machine key described, the key 23 is inserted into the groove 21 of shaft 19 and both elements then inserted into the hub 11. The portion of the key 23 extending above the outer periphery surface of the shaft 19 will naturally fall into the arcuately disposed portion 15 of the hub 11. The set screw 29 is then inserted into the opening 17 and screwed through the opening until the conical portion is wedged into the enlarged slotted portion 27 of the key 23. Slight additional pressure upon the screw by urging the screw slightly inward will cause the key to become arcuately distended thereby securely locking both the shaft and the hub.

By providing the wider portion 27 within the slit 25 in key 23 there is no possibility of damage to the conical point of the screw 27, by permitting the pointed portion of the screw to be at least extended into the cavity of the key 23. It has also been found that likewise no damage to the key itself can occur by the sharpened tip of the screw as the tip does not press against the key but is contained within the cavity of the key as set forth above. It has further been found that in instances where the screw extends into the cavity of the key, as herein, the possibility of slippage of the key is reduced to a negligible minimum.

While there has been described what is at present considered to be the preferred embodiment of this invention, it will be obvious to those skilled in the art that various changes and modifications may be made therein without departing from the invention, and it is, therefore, aimed in the appended claims to cover all such changes and modifications as fall within the true spirit and scope of the invention.

What is claimed is:

1. Means for effecting mutual rotation of a sleeve and a shaft, comprising a key positioned in a bore formed by a groove in said sleeve and an opposing groove in said shaft, said key comprising an elongated tubular member having a longitudinal slot therein, said slot having a central portion wider than its end portions, and a retaining member having a tapered end extending through an opening in said sleeve and into the widened portion of said slot in said key to securely engage said shaft and sleeve.

2. Means for effecting mutual rotation of a sleeve and a shaft, comprising a sleeve having a central bore therethrough with an arcuately shaped groove on a portion of the periphery thereof and longitudinally coextensive therewith, said sleeve having an opening extending from its outer peripheral surface to said groove, a shaft having a longitudinally disposed arcuately shaped groove on a portion of its peripheral surface terminating in an end wall, whereby when said grooves are in abutment a substantially circular aperture is formed, a key receivable in said aperture, said key comprising a hollow elongated cylindrical member having a longitudinal slot, and a retaining member extending through the opening in the sleeve and into the slot to securely lock the shaft and the sleeve.

3. The device of claim 2 wherein said retaining member is a screw having a tapered end.

4. The device of claim 2 wherein the slot of said key has an intermediate portion wider than its end portions.

References Cited in the file of this patent

UNITED STATES PATENTS

| | | |
|---|---|---|
| 266,338 | Baker | Oct. 24, 1882 |
| 309,142 | Hyde | Dec. 9, 1884 |
| 536,583 | Sedgwick | Mar. 26, 1895 |
| 1,264,230 | Vierus | Apr. 30, 1918 |
| 1,442,724 | Hogan | Jan. 16, 1923 |

FOREIGN PATENTS

| | | |
|---|---|---|
| 491,041 | Germany | Feb. 6, 1930 |

OTHER REFERENCES

Hallstrand: Abstract of Application, Serial Number 772,984, published March 18, 1952, O. G. March 18, 1952.